Feb. 16, 1965 K. RÄNTSCH ETAL 3,170,100
AUTOMATIC INDICATING DEVICE FOR MEASURING
SCALES IN MACHINE TOOLS
Filed Nov. 17, 1959 4 Sheets-Sheet 2

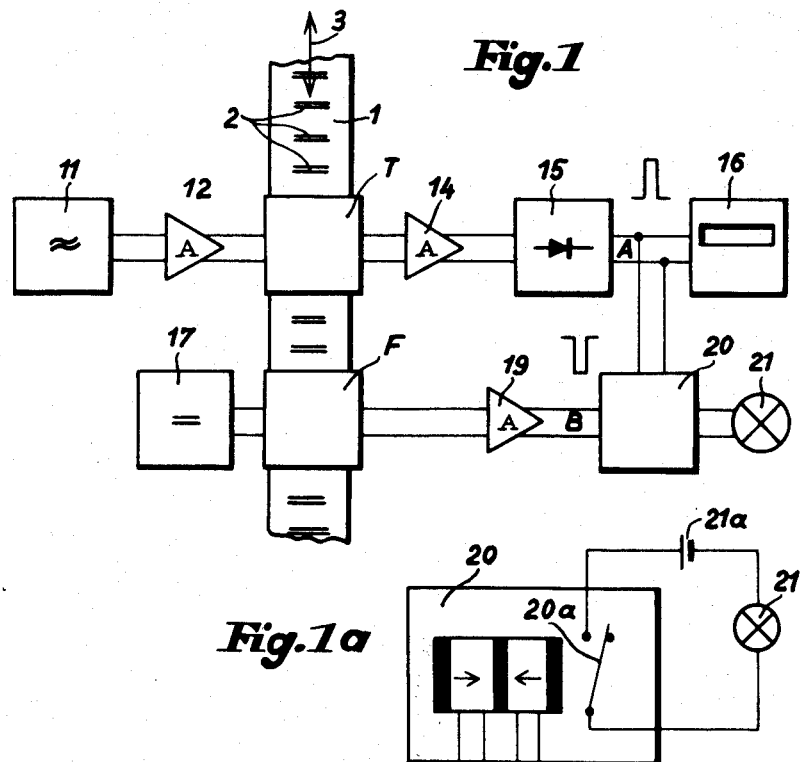
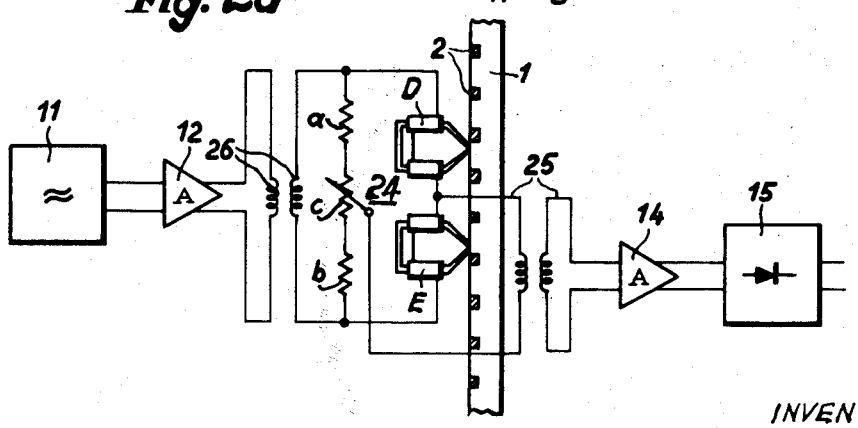

INVENTORS
KURT RÄNTSCH
OTTO TROTSCHER

By Toulmin & Toulmin
ATTORNEYS

INVENTORS
KURT RÄNTSCH
OTTO TROTSCHER

United States Patent Office 3,170,100
Patented Feb. 16, 1965

3,170,100
AUTOMATIC INDICATING DEVICE FOR MEASURING SCALES IN MACHINE TOOLS
Kurt Räntsch and Otto Trötscher, Wetzlar (Lahn), Germany, assignors to M. Hensoldt & Sohne, Optische Werke, Aktiengesellschaft, Wetzlar (Lahn), Germany
Filed Nov. 17, 1959, Ser. No. 853,564
Claims priority, application Germany, Nov. 19, 1958, H 34,851; Oct. 31, 1959, H 37,786
10 Claims. (Cl. 318—28)

The present invention relates to the measuring scales used in machine tools. More in particular, the present invention relates to an automatic device for indicating automatically the adjusting position of measuring scales in machine tools.

It is known in the art to equip the measuring scales in machine tools with a photoelectric scanning unit. The unit is displaced relative to the measuring scale and when passing over the division marks on the scale, pulses are photoelectrically produced which are then recorded in a counter.

These known scanning devices are highly sensitive to disturbance and are extremely unreliable. It may occur, for example, the current of the light source is interrupted at the very moment where the scanning unit passes over a division stroke on the scale. The division line is not recorded, and an inaccurate measured value is indicated. Furthermore, the scanning element as for example, the photoelectric cell or photo-diode are highly temperature-sensitive and are subject to photoelectric fatigue. Furthermore, it frequently occurs that the scale surface becomes dirty. In the course of operation of the machine tools consequently the division strokes cannot be properly scanned and recorded by the photoelectric unit.

For all these reasons it has become necessary to supplement the afore-mentioned unit with visually perceptible reading means wherefrom the adjusted position of the scale can be read. This is necessary in order to check the value of the adjusted position and verify, and if necessary, correct the value recorded by the photoelectric unit. It will be easily apparent that the advantage of a photoelectric unit is entirely lost by the necessity of this constant and non-automatic checking and connecting of the operation of the photoelectric unit.

It is an object of the present invention to provide an apparatus for automatically indicating the adjusted position of measuring scales in machine tools which operates entirely automatically and with a high degree of accuracy, without needing constant checking and correcting.

It is another object of the present invention to provide an apparatus for automatically indicating the adjusted position of measuring scales in machine tools which is substantially self-controlling and which is provided with signalling means indicating to the operator the rare instances where the measurement has been recorded inaccurately.

It is a further object of the present invention to provide an apparatus for automatically indicating the adjusted position of measuring scales in machine tools with which the scale can be scanned very rapidly.

Further objects of the present invention will become apparent as the description thereof proceeds. The objects are achieved by the apparatus of the invention according to which two separate scanning and indicating units are provided operating on the basis of different principles, one unit operating, for example, photoelectrically, the other unit operating magnetically, and which two units are interconnected in such a manner that they control each other. The apparatus is equipped with a signalling device giving a signal to the operator whenever different results are measured by the two scanning and indicating units.

According to one aspect of the present invention in a preferred embodiment thereof, it is suggested to provide for a reading station and a scale, which two elements are movable with respect to each other. The scale includes a base member, and there are associated with such member means defining at least two different detectable, spatially periodically changing characteristical properties thereof. For example, such means may be division strokes contrasting optically with respect to the base member; such division strokes may exhibit a different degree of magnetic conductivity as the base member; there may be periodically distributed grooves defining a rack capable of meshing with a feeler pinion. All such periodically changing characteristics on and at the base member define a scale of length.

The reading station includes two separate units individually responsive to a particular type characteristic, for example, a photoelectric scanner for the optical contrast, a magnetic reading head for the magnetic conductivity and a pinion for meshing the rack. Each scanner unit produces an output and the two outputs are compared with each other in such a manner that a deviation of one output, representing the indication of the scale of length as reproduced by the periodic changes of one characteristic, from the other output representing the indication of the same scale of length but being differently reproduced, is readily ascertainable and indicated.

The apparatus of the invention is preferably used in combination with a metal scale composed of ferromagnetic material with cut-in division marks. Such a scale can be scanned both with photoelectric scanning means, comprising, for example, a photoelectric cell, responding to the black recesses forming the division marks, and magnetic scanning means comprising, for example, a magnetic recording head responding to the change in magnetic flux at the locations of the division marks.

Since the scales are usually longer than wide it will be advantageous to use, as a magnetic scanning and indicating unit, a pair of magnetic recording heads coupled by a bridge connection, one recording head scanning the surface of the scale above or below the division marks, the other head scanning the division marks, thereby producing a change of the bridge voltage which is then amplified and used for operating indicating means such as, for example, a counter.

According to the invention it is, however, also possible to use a single magnetic recording head constituting a coupling link between a frequency source and the indicating device and operating the latter with its secondary voltage.

Another, preferred, embodiment of the invention is used with even greater advantage, where the scale has to be scanned rather rapidly and which is fully adapted to accurately record the measured values even at comparatively elevated scanning speeds. According to this embodiment of the invention a photoelectric scanning and indicating unit is associated with a mechanical unit. This mechanical unit comprises, for example, a gear meshing a rack connected with the scale and turned by displacement of the latter, thereby driving a counter or, preferably, a disk bearing a plurality of contacts closing a circuit operating the counter.

It is particularly advantageous to use a first and second counting device operated by the photoelectric unit and the mechanical unit, respectively, one of the counting devices starting to count from zero up to the desired value, the other counting device being preset to the desired value and counting back to zero.

Frequently, scales are used divided in centimeter intervals or inches, and means must be provided for subdividing the intervals of such a scale. According to the invention this can be effected by providing between the photoelectric cell in the photoelectric unit and the scale, optical means for producing an image of a portion of the scale in the photoelectric cell and means for producing a measurable deflection of the path of rays. Furthermore, there is provided a light mark and means for deflecting the light rays emanating therefrom into the path of rays, as well as interrupting means disposed between the photoelectric cell and the light mark coupled with the means for deflecting the path of rays of the image of a portion of the scale. It is thus made possible to displace only an element of the unit instead of the entire unit with the interrupted transmitting of a number of pulses corresponding to the displacement of this element to the photoelectric cell. If the entire photoelectric unit is displaced, the cell records in the light pulses emanating from the division marks of the scale.

The invention will be more fully appreciated upon the following detailed description of the drawings, wherein FIGURE 1 is a schematic plan view of the basic embodiment of the automatic indicating apparatus of the present invention;

FIGURE 1a is a diagram of the pulse mixing element used in the embodiment of the invention;

FIGURE 2a is a schematic view of a magnetic scanning and indicating unit of the embodiment shown in FIGURE 1, showing a pair of magnetic recording heads connected by a bridge circuit;

FIGURE 2b is a plan view of a portion of a measuring scale illustrating the portions thereof scanned by each of the recording heads shown in FIGURE 2a;

Figure 2B:
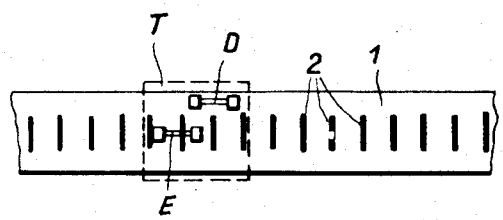

A basic embodiment of the invention will next be described in detail with reference to FIGURES 1 to 3 of the accompanying drawings, wherein 1 designates a scale connected with a machine tool (not shown), and having cut-in division marks 2. The scale can be displaced in the direction as indicated by arrow 3 for adjusting a machine tool. The body of the scale is composed of a ferromagnetic material. Above scale 1 an element T is disposed responding to a change of the magnetic flux in scale 1. The element T is fed by an audio-frequency generator 11 via an amplifier 12, and it may consist of such a structure as shown, for example, in FIGURES 2a and 3, to be described in greater detail further below. The output voltage of element T is supplied to an amplifier 14, and from the latter to a rectifier 15. The latter rectifies the voltage in such a manner, that a positive pulse is obtained when passing the element T over the division mark 2 in scale 1. This positive pulse A is supplied to a counter which it drives, so as to count the division marks over whice element T is passed.

According to the invention, the scale is provided with a second scanning device such as a photoelectric scanning device F comprising light sensitive elements known per se such as, for example, photoelectric cells, photo-diodes and the like, and energized through a D.C. voltage source 17. When passing photoelectric scanning element F over a division mark on scale 1, a voltage change is produced which is supplied to amplifier 19 and fed to a mixer stage 20 with such a polarity that a negative pulse B is effective in mixer 20. This negative pulse has the same amplitude as the positive pulse produced in the electromagnetic scanning system. The positive pulse as well as the negative pulse are supplied to a pulse mixing element 20 which, in turn, is connected with signalling means such as a lamp 21. As a pulse mixing element it is possible to use, for example, a differential relay as shown in FIGURE 1a, wherein the positive and negative pulses A and B neutralize each other, thereby maintaining the contact 20a in the opened positive and interrupting the circuit in which signalling lamp 21 is disposed, but closing contact 20a as soon as only a negative pulse B or a positive pulse A is supplied to the relay, thereby closing the circuit of signalling lamp 21 and supplying the same with power from current source 21a.

It is thus to be apparent that division strokes 2 provide for a modulation of two physical properties of base member 1: one modulation being the power of reflecting light, the other being the magnetic-conductivity. Both the modulations are of similar frequency.

The element T of the electromagnetic scanning unit may consist, for example, of a structure shown in FIGURE 2a. The carrier frequency bridge 24 is supplied with an audio-frequency of several thousand cycles from the audio-frequency generator 11 via amplifier 12 and inductive coupling means 26. The voltages which are then supplied to resistances $a$ and $b$ and the potentiometer $c$ between resistances $a$ and $b$ are also supplied to magnetic recording heads D and E. Potentiometer $c$ zero-balances the bridge and magnetic reading or pick-up heads D and E scan the surface of scale 1. As shown in FIGURE 2b, magnetic reading head D passes over the smooth portion of the surface of scale 1, whereas head E passes over the division mark 2 of scale 1, the division marks consisting, for example, of rectangular recesses in scale 1, filled with a diamagnetic material as, for example, copper. When passing magnetic reading head E over the division marks consisting of the diamagnetic material, whereas the regular surface of scale 1 consists of ferromagnetic material, the impedance of head E and thereby the bridge voltage is changed. The output of the bridge is supplied to an output transducer such as, for example, the inductive coupling 25 which, in turn, is connected to amplifier 14 and rectifier 15, the rectified pulses, for example positive pulses, then being supplied both to counter 16 and to pulse mixer 20, in which latter they are joined by the negative pulse produced in the photoelectric scanning unit.

Figure 3:
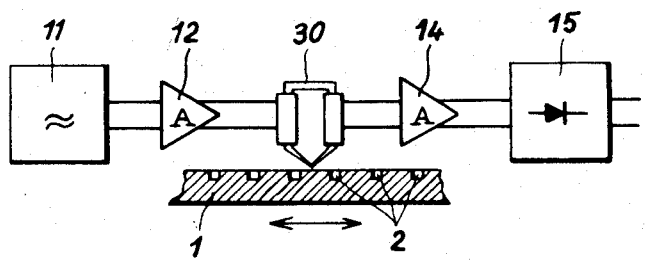
FIGURE 3 is a schematic view of the magnetic scanning and indicating unit of the embodiment shown in FIGURE 1 comprising a single magnetic recording head.

The element T may also consist of only one magnetic recording head 30 as shown, for example, in FIGURE 3. The head 30 is supplied with an alternating voltage from an A.C. source 11 via amplifier 12. The output of head 30 is connected with amplifier 14 and rectifier 15. The head 30 thus couples A.C. source 11 and amplifier 12 with amplifier 14 and rectifier 15 and operates by transmitting a change of the factor of magnetic coupling which change is effected when passing head 30 over the diamagnetic fields of division marks 2 in the ferromagnetic surface of scale 1.

The aforedescribed automatic indicating device of the present invention operates in the following manner:

As long as the pulses of rectifier 15 and amplifier 19 occur simultaneously, the negative and positive pulses neutralize each other in the pulse mixer 20, thereby maintaining contact 20a in the position shown in FIGURE 1a, interrupting the circuit of signalling lamp 21. The positive pulse of the rectifier 15 operates the counter 16 correctly.

As soon as one of the scanning devices fails to operate, one of the pulses A and B is missing, thereby failing to compensate the other pulse in pulse mixer 20. Consequently, relay contact 20a is closed and signalling lamp 21 is supplied with power from current source 21a. The signalling lamp 21 thus shows the failure in operation of the indicating device. The operator then knows that he has to check the adjusted position of the machine tool and verify whether this position is correctly indicated in counter 16 and eventually to correct the indication of counter 16.

A further preferred embodiment of the invention is particularly adapted for indicating measurements at high speeds, as the scanning unit can be passed over the scale at elevated speeds and still give correct indications of the measured values. This embodiment is shown in FIGURES 4 to 7 of the accompanying drawings and will next be described in greater detail.

The scale 101 of the machine has division marks dividing the scale into centimeters. This scale is connected with a rack 102. Above the rack a mechanical scanning device 103 is disposed and the photoelectric scanning unit 104 is provided above scale 101. Elements 103 and 104 are mounted on a carriage 100. The position of carriage 100 relative to scale 101 is to be adjusted accurately. Both scanning units 103 and 104 can be disposed parallel to scale 101, thereby causing the photoelectric scanning device to drive counter 105 and causing the mechanical scanning device 103 to operate counter 106.

Turning first to the mechanical scanning unit 103, this unit comprises a pinion 110 on a shaft 111, the pinion operates as a feeler meshing rack 102 and thus sensing the mechanical scale defined therewith. Pinion 110 turns on shaft 111 whenever unit 103 is moved parallel relative to scale 101. Shaft 111 of pinion 110 bears a disk 112 having a plurality of contacts 113. The disk 112 is insulated against shaft 111 by means of a ring 114. Opposite to disk 112 with the contacts 113 a contact 115 is disposed. Whenever one of the contacts 113 comes into contact with 115 current flows from generator G to a pulse former 116 thereby operating counter 106. Preferably counter 106 starts to count from zero so as to indicate in the correctly adjusted position of the machine the desired value, as for instance, 432 178.

The general arrangement of the photoelectric scanning advice is as follows: It is fed by the same generator G as counter 106 of the mechanical scanning unit. The photoelectric unit 104 receives light pulses coming from the division stroke 120 of the scale. The pulses are supplied to counter 105 via an amplifier 121, a pulse transformer 122, and a switch stage 123. The counter 105 consists of the counter portions 105' and 105", counter 105' recording the centimeter values and counter 105" recording fractions of a centimeter, for example in units of $\frac{1}{100}$ cm. or, as in this example, of $\frac{1}{1000}$ cm.

Figure 7:
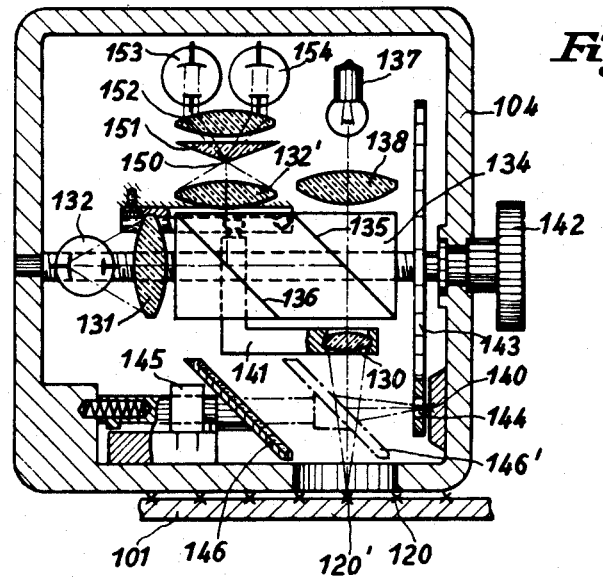
FIGURE 7 is a longitudinally sectional view of the photoelectric unit in the preferred embodiment of the invention.
Figure 4:
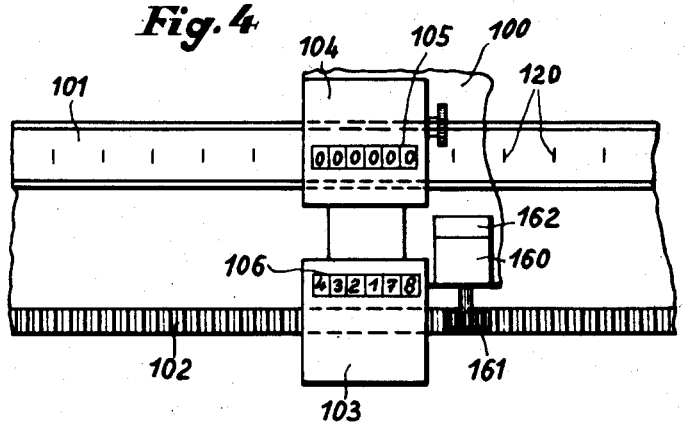
FIGURE 4 is a plan view of a portion of a measuring scale with a photoelectrically operated counter and a mechanically operated counter of the preferred embodiment of the apparatus of the invention.
Figure 5:
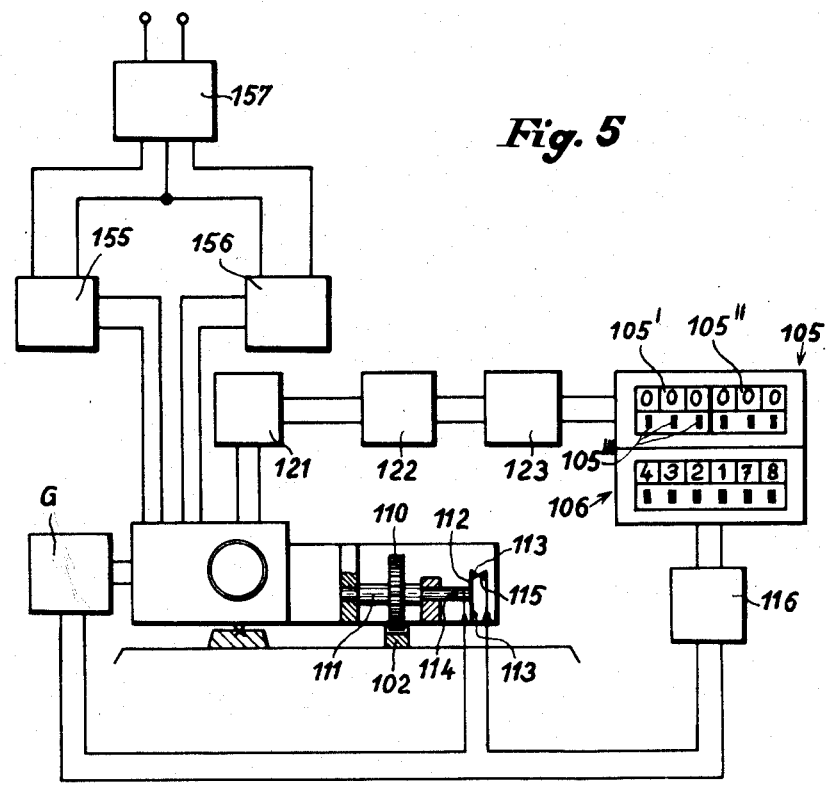
FIGURE 5 is a schematic view and partly a diagram of the preferred embodiment of the invention.
Figure 6:
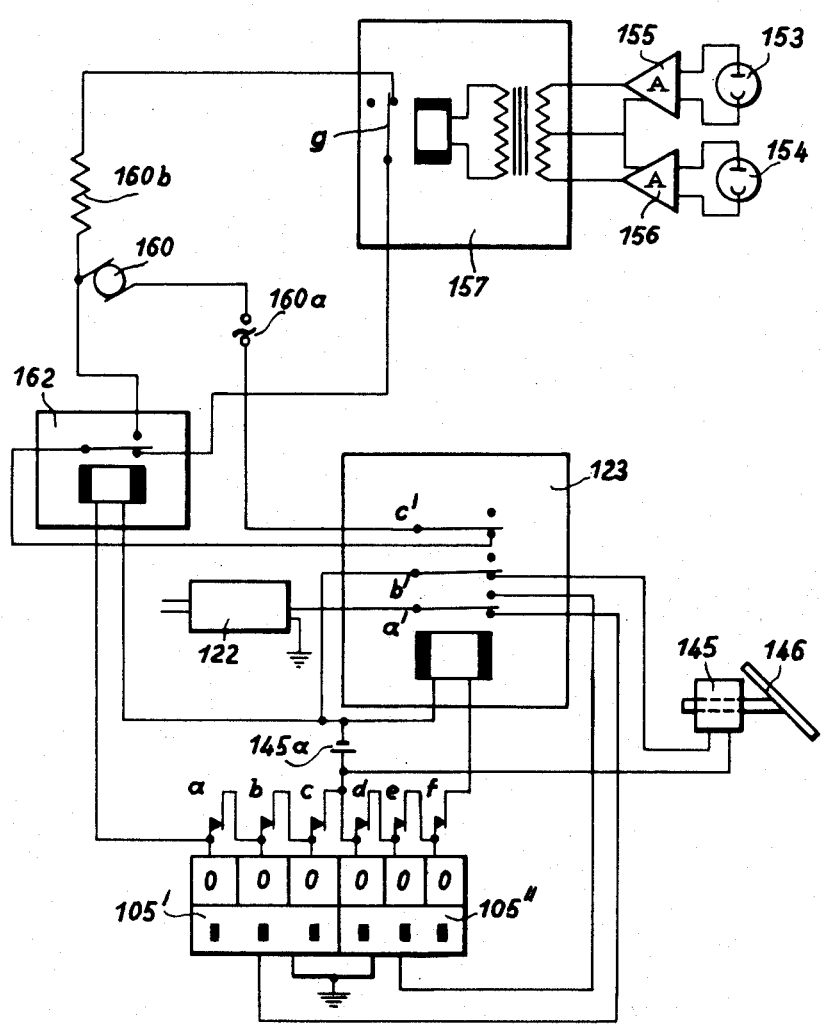
FIGURE 6 is a wiring diagram of several of the elements used in the preferred embodiment of the invention.

The particular structure and arrangement of the photoelectric scanning unit is shown in FIGURE 7. The light rays coming from scale 101 reach the photoelectric cell 132, passing through objective lenses 130, 131. The path of rays between lenses 130 and 131 is parallel and in the path of rays an optical dividing member 134 is arranged which has two semi-transparent specular surfaces 135 and 136. The light rays communicated from light source 137 and passing through condenser lens 138 are deflected by surface 135, so as to reach scale 101 and the light mark 140, respectively. The objective lens 130 can be displaced on a measuring screw 142 by means of nut 141. Screw 142 also supports a perforated disk 143 having an assembly of one hundred perforations 144 when the smallest fraction of indication is $\frac{1}{100}$ cm. or one thousand perforations when the smallest fraction is $\frac{1}{1000}$ cm. Upon rotation of screw 142 and disc 143 the perforations 144 pass over the light mark 140. A mirror 146 is positioned between scale 101 and objective lens 130. This mirror 146 can be displaced by a magnet 145. In the position of mirror 146, represented by hold lines, the light rays coming from scale 101 are allowed to pass, whereas in the position of the mirror represented with dash-dotted lines and designated with numeral 146', the light rays are deflected so as to reach photoelectric cell 132. The portion of the light rays reflected by specular semi-transparent surface 136 reach a collecting lens member 132' and the collected light rays reach the edge 150 of a prism 151 from where they are passed by means of lens 152 to a pair of photoelectric cells 153 and 154. These two photoelectric cells produce electric currents which are then amplified in amplifiers 155 and 156 and then reach the pulse-forming stage 157.

From FIG. 7, one can derive that photocells 153 and 154 receive similar amounts of light only, if contrasting stroke 120' is aligned with the optical axis of lens 130; if the latter is displaced from such aligned position, the photocells are unbalanced.

The counter 105 is constructed as a preselection counter; it is thus possible to preselect the desired value by turning the small wheels 105'''. Counter 105 is connected with a motor 160 which is put into operation as soon as counter 105" is in zero position. In order to achieve the latter purpose the three individual counters of counter 105" are connected with three contacts d, e, f, each contact being closed when its associated counter is in zero position. The three contacts are connected in series and close the circuit of motor 160 via a switch stage 123, as described in greater detail below. The motor 160 and the entire electromechanical scanning unit 103 as well as the photoelectric scanning unit 104 are connected with a slide carriage 100. The motor is connected with a gear 161 meshing with rack 102 and thereby displacing the motor and the units 103, 104, as well as slide carriage 100 along scale 101. The pulse-forming stage 157 is connected with a control stage 162 for motor 160, putting the motor out of operation as soon as the division mark 120' corresponding to the value, preselected in counter 105', appears exactly in the optical axis of displaceable objective lens 130, thereby transmitting equal light values to the photoelectric cells 153, 154. The switch stage 123, the pulse-forming stage 157, and the control stage 162, their wiring connections, as well as their connections with motor 160 and counters 105' and 105" are shown, by way of example, in greater detail in FIGURE 6 of the drawings. The counter rolls of counter 105' are connected with contacts a, b, c and the counter rolls of counter 105" are connected with contacts d, e, f, respectively. The switch stage 123 may consist, for example, of a relay having three contacts a', b', c', adapted to connect, respectively, pulse transformer 122 with counter 105' (contact a'); magnet 145 with current source 145a for displacing mirror 146 (contact b'); and motor 160 with current source 160a (contact c'). The control stage 162 may consist, for example, of a relay adapted to connect, in its resting position, motor 160 with current source 160a and, in its operating position, pulse forming stage 157 with motor 160 via a resistance 160b for operation of the motor at reduced speed.

Briefly, the following summary of the operation of the above described preferred embodiment can be given, the details of which will be explained thereafter.

The operation can be considered as a 4-step operation. Prior to any measurement lens 130 is in its zero position with respect to the housing of scanner unit 104, and the optical axis of lens 130 runs through the zero marker or stroke of scale 101.

The *first* step is to adjust counter 105 to the numerical scale value to which carriage 100 (together with unit 104) is to be shifted; adjustment is carried out by turning the little wheels 105'''. If the value is X.Y, counter 105' is adjusted to indicate X and counter 105" to indicate Y, with X being a number indicating stroke units, for example, centimeters and Y the smaller-than-unit fraction.

The *second* step occurs when knob 142 is turned so as to shift lens 130 with its optical axis relative to the housing of unit 104 and relative to scale 101, by −Y, simultaneously counter 105" is reset to zero.

The *third* step is initiated when counter 105″ reaches zero whereafter the carriage 100 with unit 104 is moved towards positive values along scale 101, whereby backcounting of X-values is commenced in counter 105′ with the zero marker being counted as a first unit. Since counter 105′ was adjusted to X, zero therein is reached at X−1.

The *fourth* step follows immediately after, when counter 105′ has reached zero, and the moving mechanism for unit 104 is first slowed down and then comes to a complete stop when the optical axis of lens 130 is aligned with marker X. Since lens 130 was shifted with respect to unit 104 during the second step by −0.Y, unit 104 is, in turn, displaced with respect to lens 130 by +0.Y, and while lens 130 is aligned with stroke "X," unit 104 with carriage has the correct position X.Y.

Whether this is true is indicated in counter 106 which then should indicate X.Y. after unit 104 with carriage has come to a complete stop.

These four steps are carried out in detail as follows:

When for the first step wheels 105‴ are adjusted for counter 105 to indicate the desired value, the contacts *a–f* of the counters are closed only whenever the counter rolls are in zero position, at least one contact of the contacts *a–f* is now opened.

Thereafter as second step the measuring screw 142 is turned and objective lens 130 is displaced relative to unit 104 and the perforated disk 143 is rotated. Consequently, the photoelectric cell 132 receives light pulses via the mirror 146 and the objective lenses 130, 131, thereby resetting the fine adjustment of counter 105″ to zero and closing the contacts *d, e, f*, thereby actuating relay 123. This terminates the second and commences the third step. The contacts *a′, b′, c′* now close and are, consequently, connecting, respectively, pulse transformer 122 with counter 105′; magnet 145 with current source 145a, thereby causing magnet 145 to displace mirror 146 until mirror 146 has reached the position shown in FIGURE 7; and connecting motor 160 with current source 160a via control stage 162, which latter is still in its resting position, thereby putting motor 160 in operation and moving carriage 100. As the photoelectric scanning unit passes over the centimeter strokes 120, light pulses reach photoelectric cell 132 which are then recorded in counter 105′, so as to reset the same to zero position. As soon as the coarse counter 105′ has reached zero, the contacts *a, b, c* close and relay 162 is actuated, which is indicative for the fourth step. Relay 162 then connects the relay in pulse former 157 via the contact *g* of the latter with motor 160 via resistance 160b. The speed of the motor is reduced due to this resistance, but the motor continues to run until objective lens 130 has assured the position exactly above the division stroke on the scale corresponding to the preselected value of counter 105′, whereupon photoelectric cells 153 and 154 receive equal voltage and the relay in pulse former 157 interrupts the motor circuit by opening contact *g*.

The slide carriage 100 now has assumed the adjusted position determined by the desired, preselected value. The desired value is indicated by the mechanical scanning unit in its counter 106 which proves that a correct displacement has been effected. In case the desired value does not appear in counter 106, a false measurement is indicated. It is thus very easy to control the correct operation by means of the indicating device of the present invention, simply by verifying the appearance of the desired value in counter 106.

The apparatus of the invention is preferably used in combination with a measuring scale of ferro-magnetic material and having cut-in division marks, which recesses are filled in with a dia-magnetic material, such as copper, bismuth, antimony, lead, silver, tellurium, and the like. Some of these substances can be blackened so as to give a better response of the photo-electric scanning means. Since elongated measuring scales are frequently composed of individual sections, the adjoining portions may produce a magnetic response, just as a division mark consisting of a single stroke. For that reason, preferably double-stroke scales are used.

It will be understood that this invention is susceptible to modification in order to adapt it to different usages and conditions, and, accordingly, it is desired to comprehend such modifications within this invention as may fall within the scope of the appended claims.

What we claim is:

1. Apparatus for automatically indicating the adjusted position of measuring scales in machine tools, comprising, in combination with a measuring scale, a photo-electric scanning and indicating unit, and a mechanical scanning and indicating unit, said mechanical unit recording and indicating the adjusted position of said scale independently from the operation of said photo-electric unit, said mechanical unit comprising a rack connected with said scale, a gear meshing said rack, a counter, electrical means for driving said counter, contact means in said electrical means, a contact disk bearing a plurality of contacts driven by said gear, said contacts on said disk cooperating consecutively with said contact means in said electrical means, thereby causing the latter to drive said counter.

2. Apparatus for automatically indicating the adjusted position of measuring scales in machine tools, comprising, in combination with a measuring scale, a photo-electric scanning and indicating unit, and a mechanical scanning and indicating unit, said mechanical unit recording and indicating the adjusted position of said scale independently from the operation of said photo-electric unit, a photoelectric cell in said photo-electric unit, and, disposed between said photo-electric scale and said scale, optical means for producing an image of a portion of said scale in said photo-electric cell, means for deflecting the path of rays of said image, a light mark, means for deflecting the light rays emanating from said light mark in the path of rays of said image, and interrupting means disposed between said photo-electric cell and said light mark and connected with said means for deflecting the path of rays of said image.

3. Apparatus as described in claim 2, comprising a displaceable mirror, electro-magnetic means for shifting said mirror between a first position wherein it guides the light rays from said light mark to said photo-electric cell and a second position wherein it allows to pass the light rays from said scale.

4. Apparatus as described in claim 2, said counting device comprising a fine counting portion actuated whenever the light rays from said light mark reach said photoelectric cell, and a coarse counting portion actuated when the light rays from said scale reach said photoelectric cell.

5. Apparatus as described in claim 4, comprising a motor displacing said photo-electric and said mechanical unit relative to said scale, and control means actuated by said fine counting portion, setting said motor in operation as soon as the measured value is preselected by said fine counting portion.

6. Apparatus as described in claim 5, comprising electric means controlled by said counting device reducing the speed of said motor as soon as said scale has been coarsely adjusted.

7. Apparatus for determining the relative position of a machine tool element with respect to a scale, comprising: a scale including a base member; means associated with said member and defining detectable spatially periodically changing characteristics of at least two structurally different physical properties of said base member so as to define a scale of length thereon; a first scanning unit comprising a photoelectric device associated with said tool element and responsive to a first one of said characteristics and producing a periodically changing output indicative of said scale of length when said scale base member is passing with respect to said first scanning unit; a second mechanical scanning unit stationary with respect to said first unit and responsive to a second one of said characteristics and producing a periodically changing output indicative of said scale of length; a counter connected to said first unit for counting said periodic changes of the output taken therefrom; and means responsive to said second periodically changing output and indicating a deviation thereof from the counting resulting in said counter.

8. Apparatus for determining the relative position of a machine tool element with respect to a scale, comprising: a scale including a base member; optically detectable division strokes on said base member defining a scale of length thereon; a mechanical scale of length associated with said base member and corresponding to said optically detectable scale of length; photoelectric detector means associated with said tool element and scanning said optically detectable scale and producing an output indicating every stroke passing; mechanical feeler means also associated with said tool element and sensing said mechanical scale of length and producing an output in form of a sequence of pulses indicative of predetermined units of the scale of length; a counter connected to one of said detector means and said feeler means and counting passing units of any of the scales of length; and means connected to the respective other one of said means and indicating a deviation of the respective output from the counted result of said counter.

9. Apparatus for determining the relative position of a machine tool element with respect to a scale comprising: a scale including a base member; means associated with said member and defining at least two detectable, spatially periodically changing characteristical properties of said member so as to define a scale of length thereon, one thereof being optically-photoelectrically detectable; a photo electric detector unit including a detector, said unit and said base member being movable with respect to each other, said detector being responsive to said optically detectable characteristics and including an optical adjustment member in the light path between said detector in said unit and said scale; means for adjusting said adjustment member relative to said unit and said scale when there is no relative motion between them; driving means for providing for such motion; pre-adjustment and control means interconnecting said detector and said driving means for setting the latter into operation for a predetermined number of passing scale units as detected by said detector means, said motor being stopped at this pre-adjusted position of said unit with respect to said scale; and means responsive to the other one of said characteristics and producing an output during and at termination of such motion, indicative for the correctness of the position of said unit with respect to scale when said motion is terminated.

10. Apparatus for automatically indicating the adjusted position of measuring scales in machine tools, comprising, in combination with a measuring scale, a photo-electric scanning and indicating unit, and a mechanical scanning and indicating unit, said mechanical unit recording and indicating the adjusted position of said scale independently from the operation of said photo-electric unit, a photo-electric cell in said photo-electric unit, and, disposed between said photo-electric scale and said scale, optical means for producing an image of a portion of said scale in said photo-electric cell, means for deflecting the path of rays of said image, a light mark, means for deflecting the light rays emanating from said light mark in the path of rays of said image, and interrupting means disposed between said photo-electric cell and said light mark and connected with said means for deflecting the path of rays of said image, said optical means including a first and a second objective lens with a parallel path of rays therebetween and disposed between said scale and said photo-electric cell with said second objective lens facing said scale, a measuring screw for displacing said second objective lens relative to said scale and for operating said interrupting means comprising a motor displacing said photo-electric and said mechanical unit relative to said scale, and control means actuated by said fine counting portion, setting said motor in operation as soon as the measured value is preselected by said fine counting portion, at least one further photo-electric cell actuating said control means for said motor, and optical means for producing image of the division strokes of said scale in said further photo-electric cell.

References Cited in the file of this patent
UNITED STATES PATENTS

| | | |
|---|---|---|
| 2,720,810 | Senn | Oct. 18, 1955 |
| 2,788,519 | Caldwell | Apr. 9, 1957 |
| 2,866,946 | Tripp | Dec. 30, 1958 |
| 2,875,524 | Bower et al. | Mar. 3, 1959 |
| 3,025,444 | Myska | Mar. 13, 1962 |